(12) United States Patent
Witzenberger et al.

(10) Patent No.: US 7,201,691 B2
(45) Date of Patent: Apr. 10, 2007

(54) ELECTRO-HYDRODYNAMIC SUPERIMPOSED STEERING SYSTEM

(75) Inventors: Max Witzenberger, Aindling (DE); Gerhard Rothfischer, Augsburg (DE)

(73) Assignee: Renk Aktiengesellschaft, Augsburg (DE)

( * ) Notice: Subject to any disclaimer, the term of this patent is extended or adjusted under 35 U.S.C. 154(b) by 202 days.

(21) Appl. No.: 10/530,827

(22) PCT Filed: Oct. 4, 2003

(86) PCT No.: PCT/EP03/11002

§ 371 (c)(1),
(2), (4) Date: Apr. 8, 2005

(87) PCT Pub. No.: WO2004/033272

PCT Pub. Date: Apr. 22, 2004

(65) Prior Publication Data

US 2006/0019787 A1    Jan. 26, 2006

(30) Foreign Application Priority Data

Oct. 8, 2002 (DE) .............................. 102 46 870

(51) Int. Cl.
*B62D 11/06* (2006.01)

(52) U.S. Cl. ........................................................ 475/28
(58) Field of Classification Search ................. 475/28, 475/18, 21

See application file for complete search history.

(56) References Cited

U.S. PATENT DOCUMENTS

| | | | | |
|---|---|---|---|---|
| 2,027,218 | A | * | 1/1936 | Armington .................... 74/664 |
| 2,047,050 | A | * | 7/1936 | Armington .................. 475/263 |
| 4,960,404 | A | | 10/1990 | Reppert et al. |

FOREIGN PATENT DOCUMENTS

| | | |
|---|---|---|
| DE | 37 28 171 A1 | 3/1989 |
| DE | 38 32 529 A1 | 3/1990 |
| WO | WO 91/10585 | 7/1991 |

\* cited by examiner

*Primary Examiner*—Dirk Wright
(74) *Attorney, Agent, or Firm*—Leydig, Voit & Mayer, Ltd.

(57) ABSTRACT

A superposition steering system for tracklaying or wheeled vehicles with nonpivoting wheels with a drive system (1) and a zero shaft (10, 10') to transfer the drive power from one drive side to the other, via at least one steering differential gear (9), wherein the zero shaft (10, 10') can be driven from a power fraction branched off from the drive system (1) and at least one electric motor (2, 2').

15 Claims, 2 Drawing Sheets

ELECTRO-HYDRODYNAMIC SUPERIMPOSED STEERING SYSTEM

FIELD OF THE INVENTION

The invention concerns an electro-hydrodynamic superimposed steering system.

BACKGROUND OF THE INVENTION

The steering of tracklaying vehicles or wheeled vehicles with wheel-side steering is known in that a steering movement is superimposed on the actual traveling movement to the effect that the driving speed is increased on outside curves and is reduced on inside curves. The actual drive system can thereby be graduated or continuous. The superposition of the steering movement takes place via summing gears, which are primarily located directly on the two gear driven ends. The summing gears are usually connected via a mechanical shaft-the so-called zero shaft-which makes possible a power flow from the inside curve to be braked to the accelerating outside curve and keeps the steering power required by the drive motor low.

The drive of the zero shaft or the steering system takes place in generally known embodiment variants in that power is branched off from the actual traction motor and is transferred to the zero shaft via continuous hydrostatic drives or via power-branched, continuous hydrostatic, mechanical or continuously hydrostatic-hydrodynamic drives.

What all mechanical and hydrostatic arrangement variants have in common, whether combined with hydrodynamics or not, is that the steering actuation is carried out in a single circuit; that is, with a breakdown of the hydrostatics, above all, with a breakdown of the mechanical-hydraulic steering of the hydrostatics, the steering system fails. The provision of a dual circuit—that is, two parallel steering actuations-leads in principle to greater complexity and further increases the risk of breakdown, since, for example, additional couplings must be incorporated, that must turn off the branch which is emitting a false steering signal.

From DE 37 28 171 C2, a continuous drive assembly for a steering system by means of an electric motor is known. This purely electrical steering system can be carried out with a dual circuit since the circuit that receives the false steering can be electrically monitored and switched off. The defective electric motor can be idled in this case, by the still intact electric motor.

Electrical steering systems, however, require, together with the needed power circuitry, an essentially larger structural space than mechanical, hydrostatic, or hydrodynamic assemblies or corresponding individual solutions.

SUMMARY OF THE INVENTION

The object of the invention is to provide a steering unit for tracklaying vehicles or wheel vehicles with wheel-side steering, which has a small overall size and a low overall weight and permits dual or multiple circuits.

This object is achieved by the invention.

A steering unit in accordance with the invention has an advantageously small overall size and low overall weight and permits integration into the drive system most economically.

Steering units in accordance with the invention can be executed with dual or multiple circuits, so that it is possible to continue to steer the vehicle in an advantageous manner when one actuation circuit breaks down.

Moreover, an arrangement in accordance with the invention permits conducting the zero shaft in a space-economizing manner centrally through the steering unit, wherein an advantageously compact structure is produced.

By the drive combination of a dual- or multiple-circuit electric motor or several individual electric motors with hydrodynamic steering couplings (one or more for movement on the right and left), the required electric steering power can be extremely reduced, in comparison to a purely electrical steering drive. It may be advantageous to provide mechanically switchable bridging couplings in addition to the hydrodynamic steering couplings, in order to be able to further reduce the electrical steering power.

Additional features and advantages are explained in more detail below with the aid of preferred embodiments shown in the drawings, of which:

DETAILED DESCRIPTION OF THE EMBODIMENTS

Figure 1:
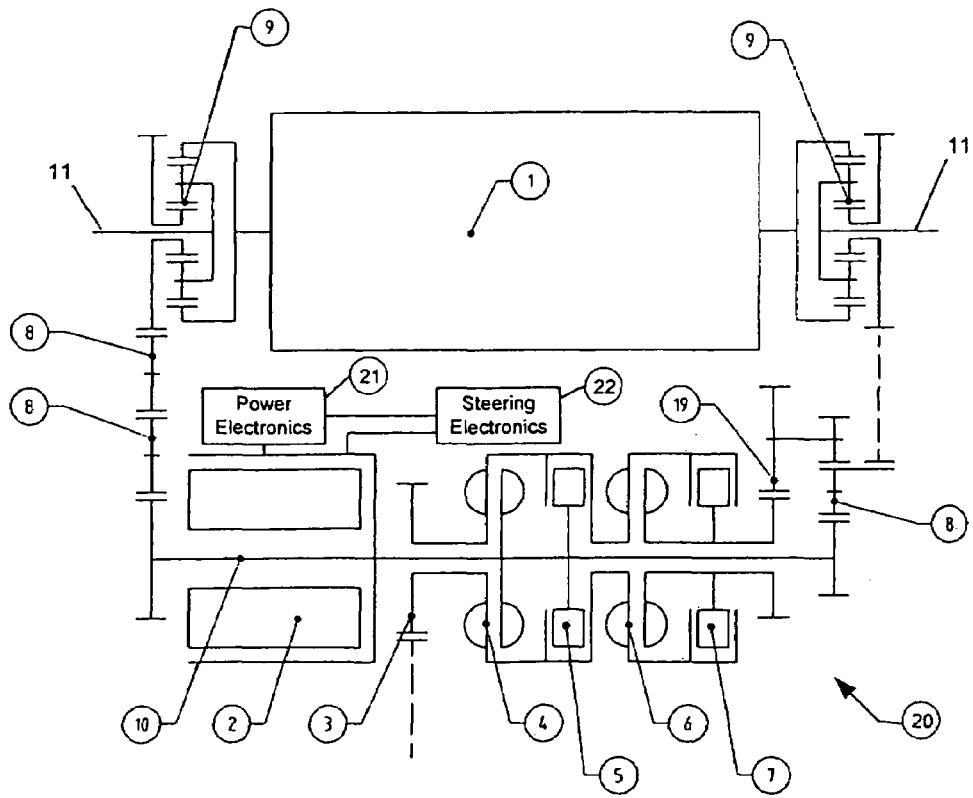
FIG. 1 shows a first embodiment in accordance with the invention, with an electric motor directly coupled to the zero shaft.

FIG. 1 shows a first embodiment in accordance with the invention, with a drive system 1, for example, consisting of a motor acting on the driven shafts 11, via an engaging and disengaging gear and steering differentials 9. The driven shafts 11 can be coupled to chain wheels to drive caterpillar tracks, for example, via step-down gears, so-called side reduction gears. Instead of with chain wheels, the driven shafts 11 can also be connected with the wheels of wheel vehicles.

The steering differentials 9 are driven by the drive system 1 via ring gears and the superposition revolutions for steering the vehicle are driven via the sun wheels of the steering differentials 9. The rotating planet wheels drive the driven shafts 11 via their sun wheels.

In traveling straight ahead or with a slight turning angle of the steering wheel, the required steering moment or the required steering power can be produced exclusively by the electric motor 2. To do this, the electric motor 2 drives the so-called zero shaft 10, which drives the sun wheels of the steering differentials 9 of the two vehicle sides in opposite directions. For this purpose, a toothed gear train with two intermediate gear wheels 8 is provided on one vehicle side and a toothed gear train with one intermediate gear wheel 8 on the other vehicle side. One side must have an even number of intermediate gear wheels 8, and the other side an uneven number, so as to accelerate one driving side and to slow down the other side.

The electric motor 2 is preferably executed with a dual or a multiple circuit—that is, the motor is provided with two or more electric windings, independent of one another, or the electric driving power is produced by two or more electric motors. If one circuit or one of the motors fails, another is always still able to function, so as to be able to drive the zero shaft 10. The electric drive can be mechanically coupled directly to the zero shaft 10 without a step-up stage. To minimize the space taken by the steering system, the power electronics 21 and steering electronics 22 may be mounted on the gem box housing the steering unit 20.

Smaller radii of curvature of the vehicle require greater steering power or an increase in steering speed, for which the power installed of the electric motor 2, intentionally held low, is no longer sufficient. In order to provide the required increase in steering power, two hydrodynamic couplings 4, 6 are provided, which can be connected and correspondingly controlled.

The hydrodynamic couplings 4, 6 are driven via a drive wheel 3, which is connected to the drive system 1. Depending on the amount of hydraulic fluid supplied, or how large their capacity is, the hydrodynamic couplings 4, 6 transfer the corresponding power to the zero shaft 10.

For a speed superposition that leads to a left curve, the first hydrodynamic coupling 4 is connected, and, correspondingly, for a right curve, the other hydrodynamic coupling 6. Which hydrodynamic coupling 4, 6 brings about which change in travel direction is a function of the number of intermediate gear wheels 8 for the given steering differential 9, wherein one side must have an even number of intermediate gear wheels 8, and the other side an odd number, and of the installation position of the steering gear in the vehicle.

In the embodiment example shown in FIG. 1, the first hydrodynamic coupling 4 is directly connected to the zero shaft 10 and the other hydrodynamic coupling 6, which is driven via the drive wheel 3 in the same direction of rotation as the first one, is coupled via a reversing gear 19 with a transmission ratio i=−1 to the zero shaft 10.

The steering differentials 9 are, on the one hand, connected to the steering gears or the zero shaft 10 and, on the other hand, to the drive system 1, and direct the force flux, via the driven shafts 11 to the vehicle tracks or wheels.

In order to circumvent the fundamental slip of the hydrodynamic couplings, it is advantageous to provide mechanical bridging couplings 5 and 7. They can be acted on in a regulated manner in accordance with the associated hydrodynamic coupling 4, 6, and can transfer, as a friction clutch, part of the available power or, completely closed, the full mechanical steering power to the zero shaft 10.

The mechanical bridging couplings 5, 7 are particularly of interest, if the electric motor, designed, for example, with a multiple circuit, would fail completely. In this case, the radius of curvature, prespecified by the turning angle of the steering wheel, could be held by the corresponding mechanical coupling 5 or 7. Particularly in comparison with hydrostatic-hydrodynamic steering drives, another reduction of the breakdown probability of the entire steering unit is thereby effected.

The mechanical bridging couplings 5 and 7 act with particular advantage, if the vehicle should be turned on the spot ("pivoting"). In a so-called rotation about a vertical axis, a vehicle should undergo a change in travel direction of a maximum 360° in the shortest possible time. During this process, the corresponding bridging coupling 5 or 7 can be completely closed and the steering speed and the steering power proportionally therefrom can be increased by up to 20%.

The essential core of the invention consists in driving a steering unit for track keying vehicles or wheeled vehicles with nonpivoting wheels by means of a relatively small-dimensioned electric motor, with a steering system which is branched off from the drive system. By means of this drive combination, a thus equipped vehicle exhibits very precise steering behavior, especially around the steering wheel zero position. Advantageously, the electric power requirement is thereby substantially lower in comparison with a purely electric drive of the zero shaft, even with a high steering power requirement (maximum value when rotating about the vertical axis). The electric drive power to be installed, which is kept comparatively low due to the arrangement in accordance with the invention, can be made part of a vehicle concept, for example, by an increase of the starter motor or by "power sharing" with other electrical loads, without a considerable increase in total structural volume. Furthermore, a steering drive in accordance with the invention can be designed with separate electric and hydraulic circuits.

Figure 2:
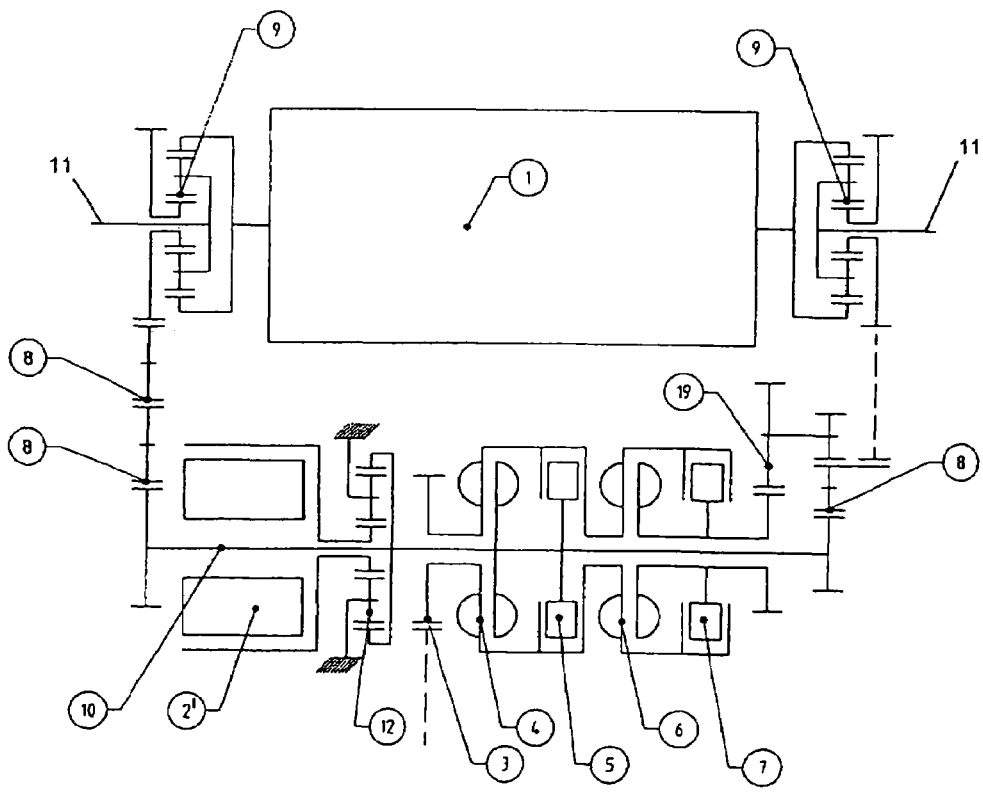
FIG. 2 represents another embodiment example with an electric motor, which drives the zero shaft via a planetary gear stage.

The version shown in FIG. 2 essentially corresponds to the one described according to FIG. 1, wherein the electric motor 2' is designed with a different rpm for the zero shaft, and for this reason, additionally requires a correspondingly designed step-up stage 12, preferably a planetary gear stage. In this way, structural space can be economized, once again with a corresponding design of the electric motor 2'.

Figure 3:
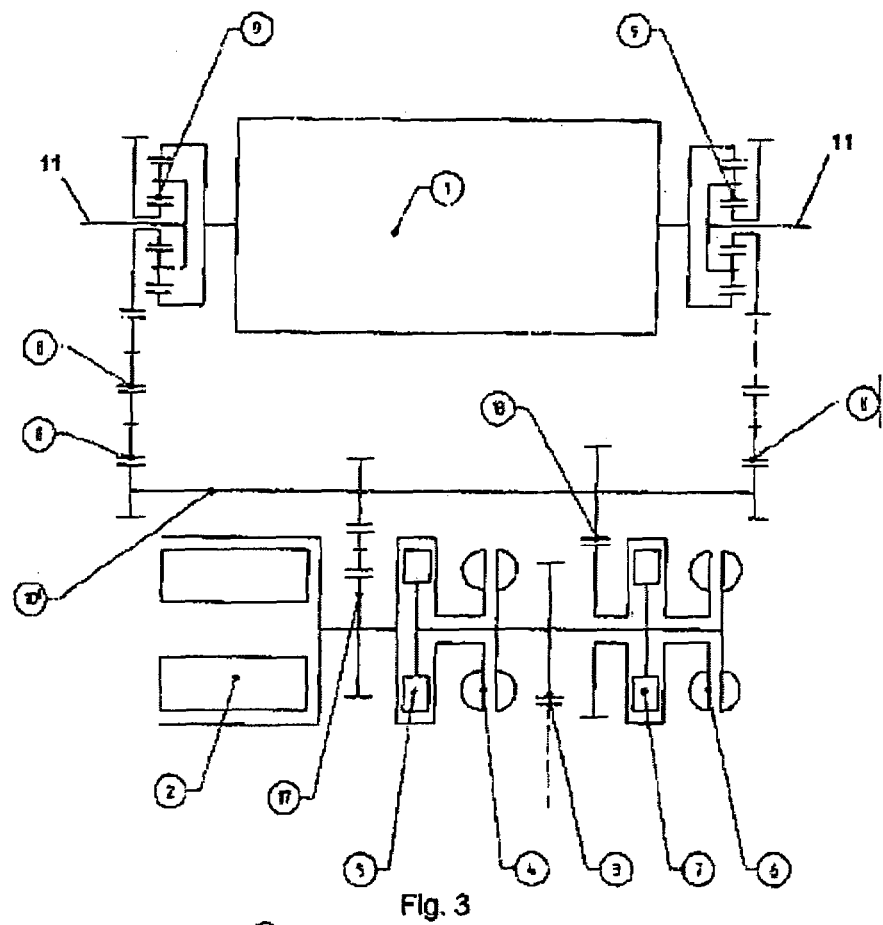
FIG. 3 shows an embodiment in which the zero shaft is conducted past outside the steering gear.

FIG. 3 shows an embodiment example with a zero shaft 10', running past the steering gear on the outside. This arrangement of the zero shaft 10' can be necessary, due to the particular type of vehicle, so as to adapt the superposition revolutions to the steering differentials 9. The electric motor 2 can drive the zero shaft 10' via a toothed gear train 17, where as with the other embodiment examples, the electric motor 2 can be controlled with respect to the direction of rotation and the rpm.

The hydrodynamic couplings 4, 7 are driven in the same direction as in the previous examples by the drive system 1, via a drive wheel 3. The first hydrodynamic coupling 4 can drive the zero shaft 10' with a controlled filling via the first toothed wheel train 17 in one direction of rotation and the other coupling 7, via the other toothed wheel train 18, in the opposite direction. The reversal of the direction of rotation of the zero shaft 10' takes place by an even or odd number of toothed wheels in the toothed gear trains 17 and 18. As in the other embodiment examples, the drive connections between the zero shaft 10' and the steering differentials 9 is implemented by an even or odd number of intermediate gear wheels 8.

Figure 4:
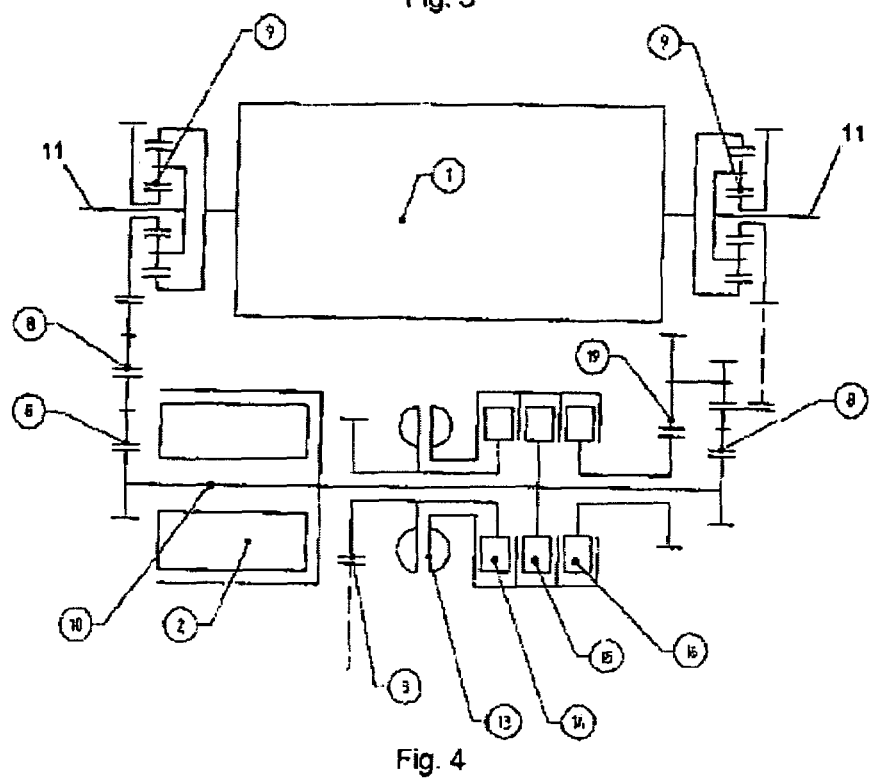
FIG. 4 shows an embodiment with only one hydrodynamic coupling and mechanical couplings for the two rotation directions of the zero shaft.

FIG. 4 shows an embodiment with only one hydrodynamic coupling 13 and two mechanical couplings 15, 16 for the two directions of rotation of the zero shaft 10. The electric motor 2 drives the zero shaft 10 directly, analogous to the version according to FIG. 1. The single hydrodynamic coupling 13 is driven via a drive wheel 3 by the drive system 1 and can transfer the drive power to the zero shaft 10, via the mechanical couplings 15 or 16, wherein a reversing gear 19 is provided for the reversal of the direction of rotation. A bridging coupling 14 can be provided for the bridging of the hydrodynamic coupling 13.

Thus, for the application of greater steering power, the corresponding mechanical coupling 15 or 16 should simultaneously be acted on, in addition to the hydrodynamic coupling 13, so as to steer the vehicle to the right or left. To circumvent the hydrodynamic slip, or in case of a breakdown of the hydrodynamic coupling 13, the bridging coupling 14 can transfer the proportion of steering power contributed by the drive system 1 to the steering couplings 15, 16.

With regard to the operational safety of the steering drive with a multiple circuit, the versions according to FIGS. 1–3 appear to be more advantageous.

In all arrangements in accordance with the invention, it is also possible to provide correspondingly controllable, load-switching mechanical couplings, such as multiple-disk clutches, instead of the hydrodynamic couplings 4, 6, 13. With such embodiments, the bridging couplings 5, 7, 14 could also be dispensed with.

In all embodiment examples, corresponding control/regulation devices are provided, which implement the steering commands, issuing from, for example, a steering wheel, with a corresponding control of the different steering elements.

The invention claimed is:

1. A superposition steering system for a track-laying or wheeled vehicle with a drive system, comprising:
    at least one steering differential gear coupled to the drive system;
    a zero shaft connected for transferring driver power from a first drive side of the drive system to a second drive side of the drive system via the steering differential gear;
    at least one electrical motor; and
    a power fraction branched off from the drive system,
    wherein the zero shaft is driven by a combination of the electrical motor and the power fraction branched off from the drive system.

2. A superposition steering system as in claim 1, wherein the power fraction includes at least one hydrodynamic steering coupling.

3. A superposition steering system as in claim 2, wherein the power fraction includes first and second hydrodynamic steering couplings for first and second rotational directions, respectively, of the zero shaft.

4. A superposition steering system as in claim 2, further including a bridging mechanical coupling for bridging said at least one hydrodynamic steering coupling.

5. A superposition steering system as in claim 4, wherein the electrical motor, the hydrodynamic steering coupling, and the bridging mechanical coupling are connected with the zero shaft via a speed-adapting gear train.

6. A superposition steering system as in claim 5, wherein the bridging mechanical coupling is a multi-disk clutch.

7. A superposition steering system as in claim 1, wherein the power fraction includes at least one mechanically controllable load-switching coupling.

8. A superposition steering system as in claim 7, wherein the power fraction includes first and second mechanically controllable switching couplings for first and second rotational directions, respectively, of the zero shaft.

9. A superposition steering system as in claim 1, wherein the electrical motor includes multiple independent electrical circuits.

10. A superposition steering system as in claim 1, including multiple electrical motors coupled to the zero shaft for driving the zero shaft.

11. A superposition steering system as in claim 1, wherein the electrical motor and the power fraction are contained in a steering unit, and wherein the zero shaft extends centrally through the steering unit.

12. A superposition steering system as in claim 1, further including power electronics and steering electronics for operating the electrical motor, wherein the power electronics and steering electronics are located on the steering unit.

13. A superposition steering system as in claim 11, wherein the steering unit is integrated with the drive system.

14. A superposition steering system as in claim 1, wherein the power fraction includes a single hydrodynamic steering coupling, a first mechanical coupling for directly driving the zero shaft in a first rotational direction, and a second mechanical coupling with a reversing gear for driving the zero shaft in a second rotational direction opposite to the first rotational direction.

15. A superposition steering system as in claim 14, wherein the first and second mechanical couplings are multi-disk clutches.

* * * * *